(No Model.)
W. SOMERVILLE.
MANUFACTURE OF GLASS PENDANTS.
No. 314,069. Patented Mar. 17, 1885.
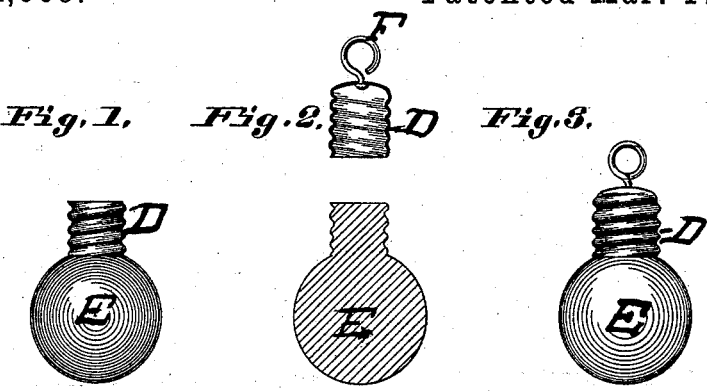
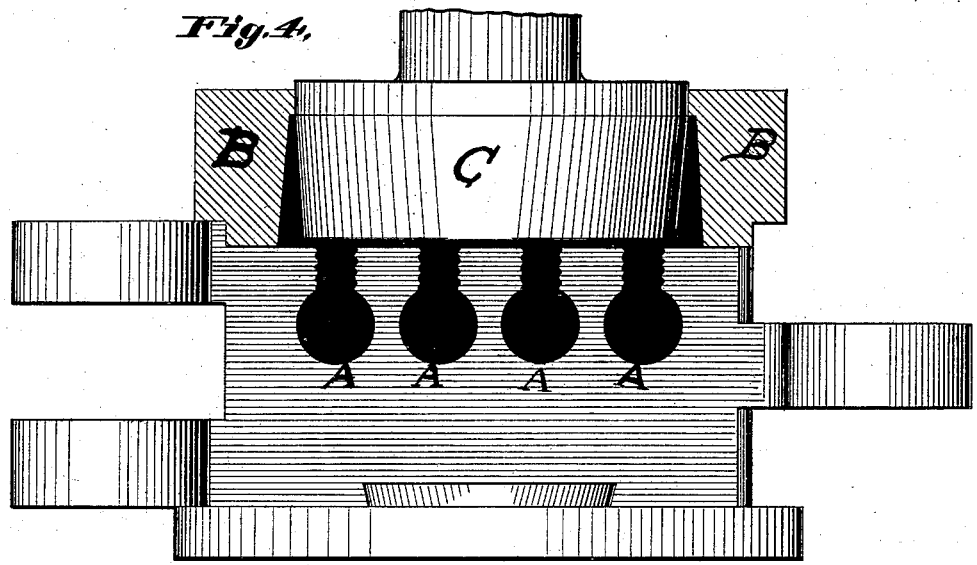
Attest:
J. L. Hornsby
Geo. Riddle
Inventor:
William Somerville by
Paul Bakewell.
his attorney

UNITED STATES PATENT OFFICE.

WILLIAM SOMERVILLE, OF ST. LOUIS, MISSOURI.

MANUFACTURE OF GLASS PENDANTS.

SPECIFICATION forming part of Letters Patent No. 314,069, dated March 17, 1885.

Application filed October 16, 1884. (No model.)

*To all whom it may concern:*

Be it known that I, WILLIAM SOMERVILLE, of the city of St. Louis, State of Missouri, have made a certain new and useful Improvement in the Manufacture of Glass Pendants, of which the following is a full, clear, and exact description, reference being had to the annexed drawings, in which—

Figure 1 is an elevation of pendant and neck; Fig. 2, a vertical section of cap and pendant; Fig. 3, an elevation of pendant and cap, showing hook in head of cap; Fig. 4, an elevation of one-half of mold, showing guide-ring in section.

My invention relates to the manufacture of ornamental glass pendants; and its object is to secure cheapness and simplicity of construction and uniformity of size and shape in the manufacture of these pendants.

Heretofore glass pendants such as it is the object of this invention to improve the manufacture of were made by what is known as the "hand process"—that is, glass was taken from the pots at the end of a rod, and one at a time glass balls or drops were formed by the manipulation of the workman. But this is a slow process, and it is impossible in this way to make the balls true, nor can they be made of uniform size in this manner. Then, after the ball or piece is formed, the glass is drilled and the metal piece which forms the hanging projection is attached to the ball by means of cement, and this involves labor and expense.

My invention is described as follows: I use an ordinary jointed mold, one-half of which is shown in Fig. 4 of drawings, and on top of this mold, preferably fitting in a groove on top of mold, I place a ring, B. (Shown in section in Fig. 4.) This ring B, when on top of mold, as in Fig. 4, serves as a receptacle for molten glass, and also as a guide for plunger C, also shown in Fig. 4. This mold I provide with openings A, in any desirable number or of any dimension or configuration that may suit the fancy; but the top of these openings are threaded. The plunger C, at its upper end, fits the opening of ring B snugly; but below that point the sides of plunger C are constructed and arranged as described, in order that the glass may be kept within the receptacle formed by ring and top of mold and only allowed to find space about the sides and bottom of plunger C and in the openings A. When the glass is poured into the mold, it fills up openings A and lies in receptacle formed by ring B and top of mold. The plunger C, being then forced down upon the glass, compresses it in openings A, and the glass that does not find room in openings A lies underneath plunger C or rises at the sides of plunger C, as shown in black in Fig. 4. Thus compressed, the glass takes the exact configurations of openings A or openings corresponding thereto, and, when plunger C is removed and the mold opened, the glass in the space between the top of the openings A and bottom of plunger C and between sides of plunger and ring B serves as a handle or connection between the several pendant pieces E, by means of which the several pieces of glass molded into desirable shapes can be extracted together and subjected to fire polishing and tempering, and then these several pieces are broken off, leaving them as shown in section in Fig. 2—that is, a glass pendant, E, with a screw-shaped neck.

A simple and strong hanging connection for this glass piece or pendant is made by a cap-piece, D, of metal, internally a female screw, and having a hook projection, F, at its top. (See Figs. 2 and 3.) This female-screw cap-piece D, when connected with screw-shaped neck of glass piece, completes my improved pendant.

Another way of making a pendant according to my invention, when it is desirable to make the pendant hollow to receive a colored liquid, or for any other reason, is to blow glass in a mold having an opening of any desirable shape when the top of the opening of the mold is threaded, so that the glass may have a screw-shaped neck.

I claim—

1. A pressed-glass pendant having a threaded neck, substantially as described.

2. In a glass pendant, the combination of a pressed-glass drop having a threaded neck, and a cap-piece made to screw upon the threaded neck of the glass pendant, substantially as described.

3. The combination, in a glass pendant, of the glass piece E, (pressed or blown,) having a threaded neck, and a cap-piece, D, substantially as described.

4. The combination, in a glass pendant, of the glass piece E, (pressed or blown,) having a threaded neck, cap-piece D, and hook F, substantially as described.

In testimony whereof I have affixed my signature in presence of two witnesses.

WILLIAM SOMERVILLE.

Witnesses:
 PAUL BAKEWELL,
 J. W. RIDDLE.